United States Patent
Kambies

[19]

[11] Patent Number: 5,941,776
[45] Date of Patent: Aug. 24, 1999

[54] STEERING SYSTEM FOR A MOTOR VEHICLE HAVING A LOWER STEERING SPINDLE

[75] Inventor: Thomas Kambies, Rosengarten, Germany

[73] Assignee: Daimler-Benz Aktiengesellschaft, Germany

[21] Appl. No.: 08/917,139

[22] Filed: Aug. 25, 1997

[30] Foreign Application Priority Data

Aug. 23, 1996 [DE] Germany .............. 196 34 101

[51] Int. Cl.[6] ................................................ F16D 3/52
[52] U.S. Cl. ................................. 464/93; 280/777
[58] Field of Search ...................... 464/87, 92, 93, 464/137; 280/777; 74/492

[56] References Cited

U.S. PATENT DOCUMENTS

| | | | |
|---|---|---|---|
| 3,408,831 | 11/1968 | Schoeben | 464/93 |
| 3,478,539 | 11/1969 | Daur | 464/93 |
| 3,654,775 | 4/1972 | Williams | 464/93 |
| 4,702,722 | 10/1987 | Narue et al. | 464/93 |
| 5,222,913 | 6/1993 | Nagashima | 464/93 |
| 5,588,916 | 12/1996 | More | 464/92 |

FOREIGN PATENT DOCUMENTS

| | | |
|---|---|---|
| 28 55 524 A1 | 7/1980 | Germany . |
| 57-15126 | 1/1982 | Japan ............ 464/93 |
| 60-158025 | 10/1985 | Japan . |
| 2-67116 | 5/1990 | Japan . |
| 3-4031 | 1/1991 | Japan . |
| 4-64718 | 2/1992 | Japan ............ 464/93 |

*Primary Examiner*—Eileen Dunn Lillis
*Attorney, Agent, or Firm*—Evenson, Mckeown, Edwards & Lenahan, P.L.L.C.

[57] ABSTRACT

A steering system for a passenger motor vehicle has a lower steering spindle. A rubber-elastic damping block is provided as a damping device, and one or more guide members which project freely along the spindle axis is assigned to each respective spindle part. The guide members of the opposite spindle parts are axially slidably in opposite directions disposed in corresponding guide receiving devices of the damping block. The axial displaceability of the guide members is limited within the guide receiving devices by axial securing devices assigned to each spindle part.

7 Claims, 2 Drawing Sheets

STEERING SYSTEM FOR A MOTOR VEHICLE HAVING A LOWER STEERING SPINDLE

BACKGROUND AND SUMMARY OF THE INVENTION

The present invention relates to a steering system for a motor vehicle having a lower steering spindle which is divided into two steering spindle parts which are connected with one another by way of elastic damping devices.

In known steering systems for motor vehicles, jolts and vibrations which affect the steering system from the road are damped by flexible disks. In addition, axially displaceable elements are provided to compensate for steering bolster movements. Such axially displaceable elements are also used in longitudinally adjustable steering columns.

DE 28 55 524 A1 describes a steering system having a lower steering spindle which is divided into two steering spindle parts. The two steering spindle parts are connected with one another by a steering coupling which, for achieving a sufficient steering elasticity, has torsionally elastic coupling elements. In addition, a torsional damper is integrated in the steering coupling which can absorb disturbing vibrations. However, axial relative movements cannot be compensated.

It is an object of the present invention to provide a steering system which, by simple and compact devices, ensures an axial compensation as well as a sufficient steering elasticity.

This object has been achieved in accordance with the present invention in that a rubber-elastic damping block serves as a damping device, and one guide member is assigned to each respective spindle part and projects freely along the spindle axis. The guide members of the opposite spindle parts are disposed in an oppositely axially displaceable manner in corresponding guide receiving devices of the damping block. The axial displaceability of the guide members within the guide receiving devices is limited by axial securing devices assigned to each spindle part.

As a result of the features of the present invention which achieves a compact constructional unit, a sufficient radial steering elasticity as well as an axial displaceability of the two spindle parts relative to one another is implemented. By the providing only a single constructional unit, fewer components are required in comparison to conventional arrangements. In addition, the steering system has a reduced weight, and, because of this constructional unit, the steering system can be manufactured, mounted and demounted at much lower cost and effort.

As a further feature of the invention, the damping block has a cylinder-shaped configuration and is enclosed by a hollow-cylindrical housing sleeve in which the guiding members and the axial securing devices are also arranged. The constructional unit therefore forms a torsionally elastic and axially movable coupling between the two spindle parts, in which the housing sleeve is used as a coupling housing.

Another aspect of the present invention is that at least four passage ducts are integrated in the damping block which are used as guide receiving devices and which are arranged parallel to one another at uniform distances on a common circular line which is concentric with respect to the longitudinal center line. From opposite sides of the passage ducts a corresponding number of guide pins project into the passage ducts and are used as guide members whose length is larger than the length of the passage ducts. As a result, an axial displaceability is achieved while the axial guiding remains uniform. Because at least two guide pins are assigned to each spindle part, a reliable, rotationally locking drive is also achieved by way of the damping block.

According to yet another aspect of the present invention, the two or more guide pins for each respective spindle part are held in a radial guide disk which is disposed inside the housing sleeve in an axially linearly movable manner and which is fixed on the respective spindle part. Thereby, an operationally reliable connection is established between the spindle parts and the guide pins.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
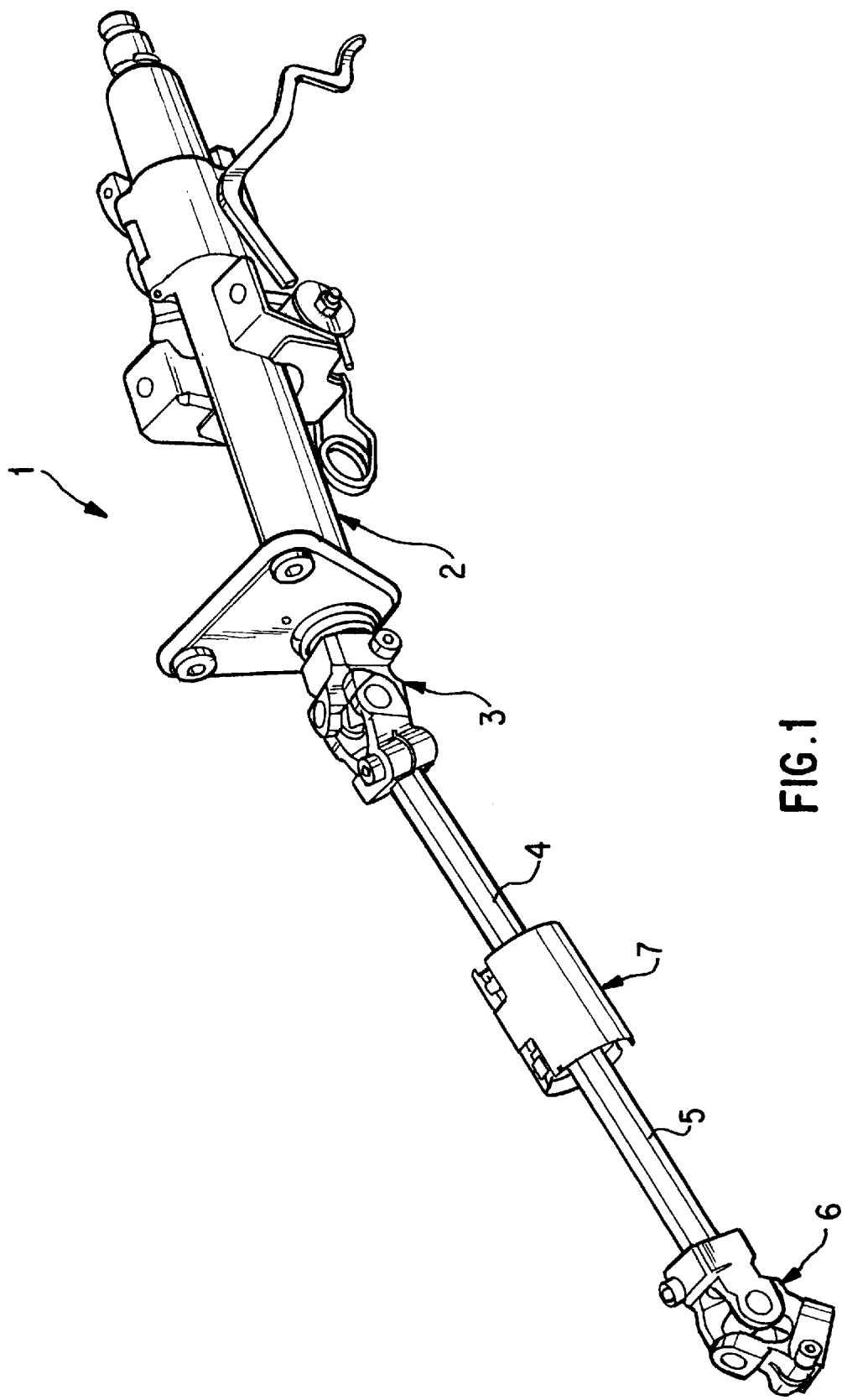
FIG. 1 is a perspective view of an embodiment of a steering system according to the present invention with two spindle parts of a lower steering spindle which are connected with one another by a steering coupling.

A steering system designated generally by numeral 1 has an upper steering spindle which is disposed on a steering column tube 2 and onto whose upper front end, which projects in a known manner into a vehicle interior, a steering wheel can be placed. The steering spindle disposed in the steering column tube 2 is connected by a universal joint 3 with a lower steering spindle 4, 5 which, along with another universal joint 6, adjoins a steering gear again in a known manner which need not be discussed further.

Figure 2:
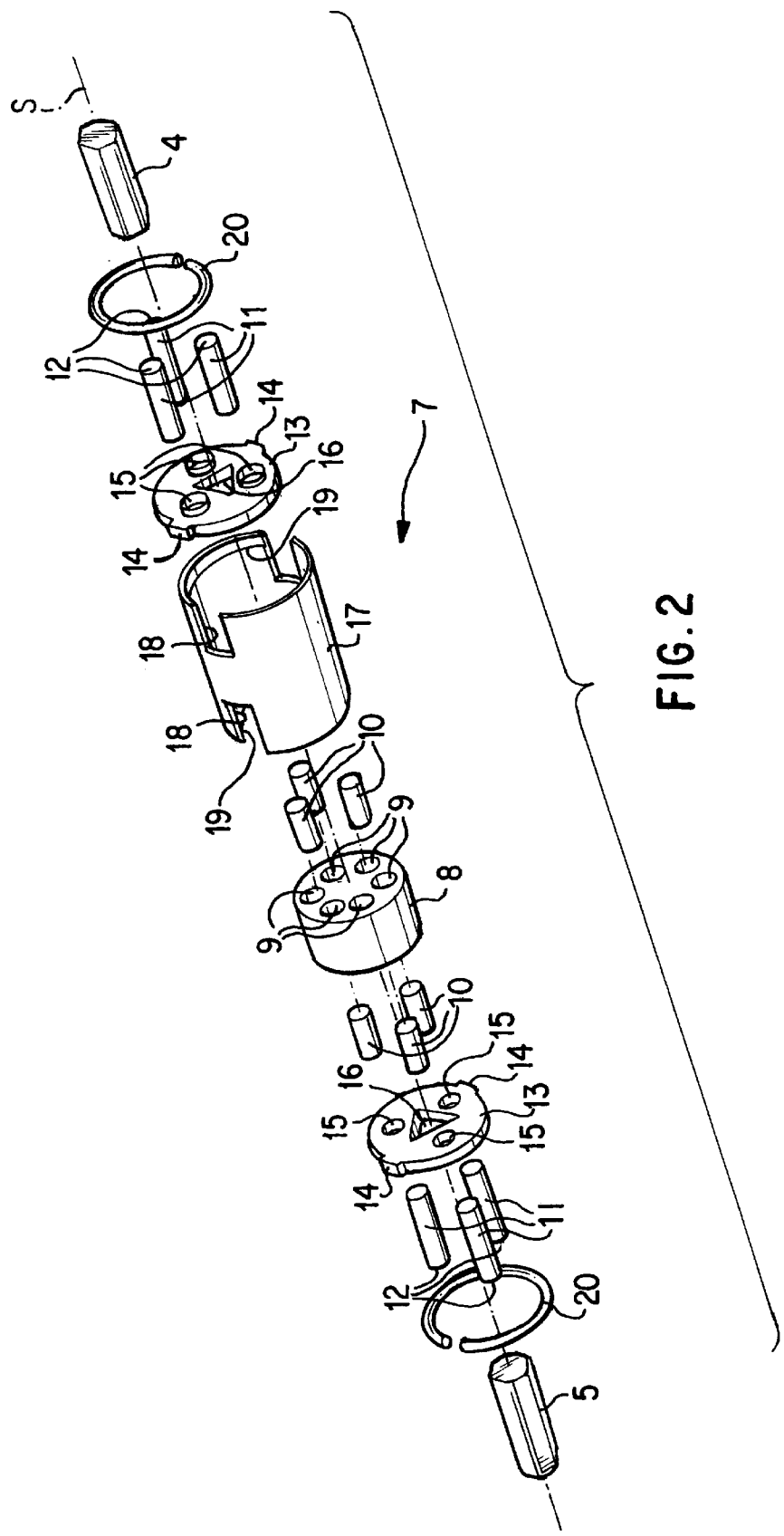
FIG. 2 is a perspective exploded view of the steering coupling for connecting the two lower steering spindle parts according to FIG. 1.

The lower steering spindle 4, 5 is divided into an upper steering spindle part 4 and into a lower steering spindle part 5, which are connected with one another by a steering coupling 7. The steering coupling 7 permits an axial displaceability of the two steering spindle parts 4, 5 with respect to one another relative to a steering spindle axis S (FIG. 2), and also has elastic damping devices which compensate shocks and vibrations which are transmitted from the road to the lower steering spindle 4, 5.

A cylindrical damping block 8 made of a rubber material is provided as an elastic damping device. The rubber block 8 has passage bores 9 which are axially parallel to the steering spindle axis S on a circular line which is concentric with respect to the steering spindle axis S. A guide sleeve 10 is pressed into each of the passage bores 9. In the guide sleeves 10 and therefore also in the passage bores 9, a total of six cylindrically-shaped guide pins 11 are disposed in an axially displaceable manner. The length of the guide pins 11 is larger than the length of the passage bores 9 and of the guide sleeves 10 so that, also in the case of axially partly pulled-out guide pins 11, a sufficient axial guiding by the guide sleeves 10 and the passage bores 9 is still achieved. The guide sleeves 10 are by metal sliding sleeves made of metal, and the guide pins 11 are also made of metal.

Three guide pins 11 respectively project from opposite sides into the damping block 8 so that, in the circumferential direction of the damping block 8, in each case, the mutually adjacent guide pins 11 are axially opposed to one another. The three lower guide pins 11 are assigned to the steering spindle part 5 in the following manner. The three upper guide pins 11 are assigned to the upper steering spindle part 4. On their head end facing the respective spindle part 4, 5, all guide pins 11 have a radial collar 12 for holding each group of three guide pins in a guide disk 13. The guide disk 13 is provided with three respective receiving sleeves 15 which project axially through the guide disk 13 and, according to an equal-sided triangle, are aligned axially in parallel to the steering spindle axis S and thus also to the longitudinal center axis of the guide disk 13.

In the central area of the guide disk 13, a triangular passage 16 is provided for fixing each guide disk 13 on the pertaining free end of the respectively assigned steering spindle part 4, 5. Each steering spindle part 4, 5 is constructed as a hexagonal profile, and the triangular passage 16 in each guide disk 13 is coordinated with this hexagonal profile such that a form-locking driving in the rotating direction is achieved by the respective steering spindle part 4, 5. In addition, the guide disk 13 is axially fixed on the respective free face of the assigned steering spindle part 4, 5 in its radial alignment relative to the steering spindle axis S. The axial fixing can take place by a welded connection.

The outer circumference of each guide disk 13 has two opposed guide cams 14 for axially movably guiding each guide disk 13 in a hollow-cylindrical housing sleeve 17. For this purpose, two axial grooves 18 respectively are provided in the housing sleeve 17 for each guide disk 13 from the direction of the opposite faces of the housing sleeve 17. The guide cams 14 are constructed to be smaller than the axial grooves 18 in the housing sleeve 17. This play results in a stop of the guide disk 13 in the housing sleeve 17 and protects the damping block 8 from an overloading. Consequently, with very large torques outside the operating range, the elastic part is eliminated, and a pure form closure exists. Thus, in the normal operating range, a torsional damping is obtained which extends to the stop of the guide cams.

For mounting of the steering coupling 7, the guide disks 13 are first fixed on the pertaining steering spindle parts 4, 5. Subsequently, the guide pins 14 are pushed into the receiving sleeves 15 of the respective guide disk 13 such that the head ends point to the respective steering spindle part 4, 5. As soon as the head ends provided with the ring collars 12 axially impact on the receiving sleeves 15, the guide pins 11 have reached their operating position and can be fixed axially to the guide disk 13. Subsequently the guide pins 11, including the guide disks 13, are introduced into the housing sleeve 17 in which the damping block 8 is already arranged. The damping block 8 is aligned in the circumferential direction such that the guide pins 11 of the two guide disks can engage in the assigned guide sleeves 10 inside the passage bores 9. The axial securing of the guide disks 13 inside the housing sleeve 17 takes place by two securing rings 20 which can be inserted in corresponding radial grooves 19 on the interior wall of the housing sleeve 17. A new demounting takes place in a simple manner by releasing the securing rings 20 and by then removing the individual parts of the steering coupling 7 from the housing sleeve 17.

On one hand, the rubber-elastic damping block 8 has a torsionally elastic effect during relative rotations between the steering spindle parts 4 and S because the corresponding rotating movements are transmitted by way of the guide pins 11 directly into the damping block 8. On the other hand, the damping block 8 ensures an axial guiding of the guide pins 11 and thus an axial displaceability of the steering spindle parts 4 and 5 relative to one another. The axial length of the damping block 8 is precisely adapted to the spacing of the floors of the two axial grooves 18 so that the damping block 8 is also not loaded in the axial direction when both guide disks 13 extend axially toward the inside onto a block.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Steering system for a motor vehicle, comprising a lower steering spindle which is divided into two steering spindle parts, a rubber-elastic damping block operatively connecting the two steering spindle parts, and at least one guide member arranged to project freely along in a direction of the spindle axis and associated with each of the spindle parts, wherein, in a finally-installed mounted position, the at least one guide member of the spindle parts is axially displaceably disposed to move in opposite directions in and relative to corresponding guide receiving devices of the damping block, and the axial displaceability of the at least one guide member within the guide receiving devices caused by forces during a driving operation of the motor vehicle is limited by axial securing devices associated with each of the spindle parts.

2. The steering system according to claim 1, wherein the damping block is cylindrically configured and is enclosed by a hollow-cylindrical housing sleeve in which the at least one guide member and the axial securing devices are also operatively arranged.

3. The steering system according to claim 2, wherein at least four parallel passage ducts are provided in the damping block as the guide receiving devices and are spaced at uniform distances on a common circular line concentric with respect to a longitudinal center axis, and a corresponding number of guide pins comprising the at least one guide member project from opposite sides of the damping block into the passage ducts, the guide pins having a length larger than a length of the passage ducts.

4. The steering system according to claim 3, wherein the at least one guide member constitutes additional two guide pins for each spindle part operatively held in a radial guide disk disposed within the housing sleeve in an axially linearly movable manner and fixed on each of the respective spindle parts.

5. The steering system according to claim 4, wherein the guide disks have opposed guide cams on an outer circumference to engage in corresponding axial grooves in the housing sleeve.

6. The steering system according to claim 4, wherein each of the guide pins has a head end provided with a ring collar for axially securing the respective guide pin in a corresponding passage of the associated guide disk.

7. The steering system according to claim 6, wherein each guide disk is fixed on the associated spindle parts in a coaxial and rotationally locking manner.

* * * * *